ERROR CONTROL SYSTEM

Filed April 1, 1964 3 Sheets-Sheet 1

INVENTORS: L. P. MC RAE
R. N. WATTS
W. J. WOLF, JR.
BY Lucian C. Canepa
ATTORNEY

FIG. 3

G =

1100001100100000000000000000000
0110000110010000000000000000000
0011000011001000000000000000000
1101101101000100000000000000000
1010111010000010000000000000000
0101011101000001000000000000000
1110100010000000100000000000000
0111010001000000010000000000000
1111100100000000001000000000000
0111110010000000000100000000000
0011111001000000000010000000000
1101110000000000000001000000000
0110111000000000000000100000000
0011011100000000000000010000000
0001101110000000000000001000000
0000110111000000000000000100000
1100010111000000000000000010000
1010000111000000000000000001000
1001001111000000000000000000100
1000101011000000000000000000010
1000011001000000000000000000001

FIG. 4

H =

1000000000100110101001000011111
0100000000110101111101100010000
0010000000011010111110110001000
0001000000001101011111011000100
0000100000000110101111101100010
0000010000000011010111110110001
0000001000100111000010111000111
0000000100110101001000011111100
0000000010011010100100001111110
0000000001001101010010000111111

3,471,830
Patented Oct. 7, 1969

3,471,830

ERROR CONTROL SYSTEM

Lorin P. McRae, Tucson, Ariz., and Robert N. Watts, Westfield, and William J. Wolf, Jr., New Shrewsbury, N.J., assignors to Bell Telephone Laboratories, Incorporated, New York, N.Y., a corporation of New York Filed Apr. 1, 1964, Ser. No. 356,528
Int. Cl. G06f *11/00*
U.S. Cl. 340—146.1 9 Claims

ABSTRACT OF THE DISCLOSURE

The operation of an error control system is significantly enhanced by the simple expedient of respectively inverting the individual digits of a generated check signal sequence before applying the sequence and its associated data sequence to a transmission channel. The check signal sequence is derived from the data sequence in accordance with conventional cyclic encoding techniques. Thereafter each digit of the check sequence is simply inverted ("1's" to "0's" and "0's" to "1's"). As a result of the check signal inversion, there is embodied in the modified redundant sequence an out-of-synchronism detecting capability that is not present in an unmodified sequence that includes non-inverted check signals.

Figure 1:
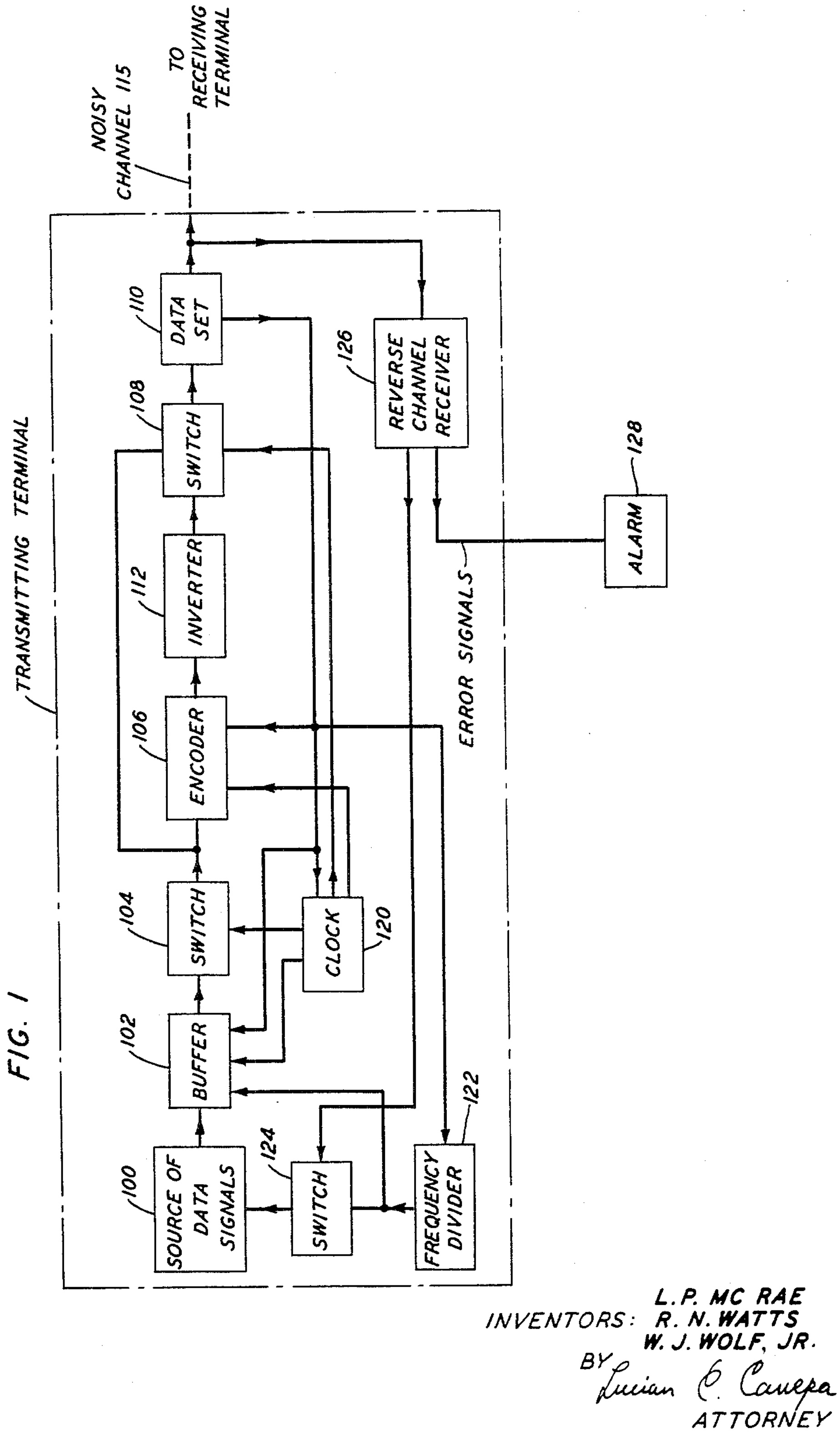

This invention relates to digital information-processing systems and more particularly to the automatic detection of errors in such systems.

The problem of transmitting digital signals in a reliable manner over a noisy channel is a significant one whose solution has been actively sought. Some illustrative situations in which this problem arises are: when telephone lines subject to error impulses are being used to transmit data in digital form; when an imperfect medium such as magnetic tape or photographic emulsion is used to store digital data; or when operations on digital signals are being carried out by means of circuits constructed of devices such as relays, diodes or transistors which have a probability of error.

By using techniques of redundancy it is possible to encode digital data signals to be transmitted in such a way that a receiving terminal is able with a high degree of reliability to detect that the received signals are not exact replicas of the transmitted ones.

The so-called Bose-Chaudhuri codes, as described, for example, in "Error-Correcting Codes" by W. W. Peterson, at pages 162–181, the MIT Press and John Wiley and Sons, 1961, specify one particularly efficient manner in which digital data signal sequences to be transmitted may be encoded to possess error-detecting capabilities.

Data sequences which are encoded in a system in accordance with the Bose-Chaudhuri codes form elements of a systematic cyclic code. Thus each transmitted sequence thereof is a cyclic permutation of another element of the code. As a result, loss of synchronism by one digit position in such a system may not be detected by the receiver thereof. Instead, the out-of-synchronism sequence may be accepted by the receiver, with a probability of one-half, as an allowable sequence.

It is apparent therefore that errors in a data processing system may arise either from individual digits being mutiliated during transmission or from loss of synchronism between the transmitting and receiving equipment. High quality detection procedures for a system of this general type must be capable of detecting both types of error occurrences in a reliable manner.

An object of the present invention is the improvement of digital information-processing systems.

More specifically, an object of this invention is a redundant digital information-processing system having the capability to detect the occurrence of errors therein with a high degree of reliability.

Another object of the present invention is an information-processing system which is capable of detecting the occurrence therein of mutilated digits and also of detecting the occurrence of errors arising from loss of synchronism between the transmitting and receiving equipment thereof.

Another object of this invention is an error-detecting system whose over-all organization is characterized by simplicity of design.

Yet another object of the present invention is an error-detecting system in which both the transmitting and receiving equipment thereof is alerted whenever an erroneous signal sequence is supplied to the receiving equipment.

These and other objects of the present invention are realized in a specific illustrative system embodiment thereof in which signals comprising a data word to be transmitted to a receiver via a noisy communication medium are first encoded in accordance with a Bose-Chaudhuri code which possesses error-detecting capabilities. The result of the encoding is to append a parity check digit sequence to the data word, thereby to form a redundant signal sequence. The redundant sequence is transmitted to the receiver wherein a parity check digit sequence is recalculated from the data word portion of the redundant sequence. The recalculated parity sequence is then compared with the received parity sequence to provide an indictaion of the occurrence of errors. This error indication is supplied to associated circuitry in the receiver and, in addition, is transmitted via a narrow-band reverse channel to the transmitting equipment.

As mentioned above, the redundant sequences processed by the illustrative system are elements of a systematic cyclic code. Since each element of such a code is a cyclic permutation of another element of the code, it is possible that loss of synchronism between the transmitter and receiver by one digit position may go undetected by the receiving equipment. If such an occurrence does go undetected, the data signal sequence accepted by the receiver would in general not be an exact replica of the data sequence originally encoded by the transmitting equipment.

However, in accordance with the principles of the present invention, the parity check digits generated by the encoder are inverted before being appended to the data word and transmitted to the receiving equipment. At the receiver the check digits are reinverted before being compared with the check digits that are recalculated from the data word portion of the received sequence. In accordance with this novel technique, it is possible to detect the occurrence of an out-of-synchronism sequence in a highly reliable manner, without affecting the capability of the system to detect the presence of mutilated digits during periods of in-synchronism operation.

It is a feature of the present invention that an error-detecting system include a transmitting terminal in which digital data words to be transmitted via a noisy channel to a receiving terminal are each encoded by appending thereto a parity check digit sequence, thereby to form an element of a systematic cyclic code, and that the terminal further include circuitry for inverting each digit of the parity sequence before the encoded word is applied to the channel.

It is another feature of this invention that an error-detecting system include a receiving terminal in which the inverted parity check digits of each received redundant sequence are reinverted before being compared with recalculated check digits derived from the data word portion of a received sequence.

Figure 2:
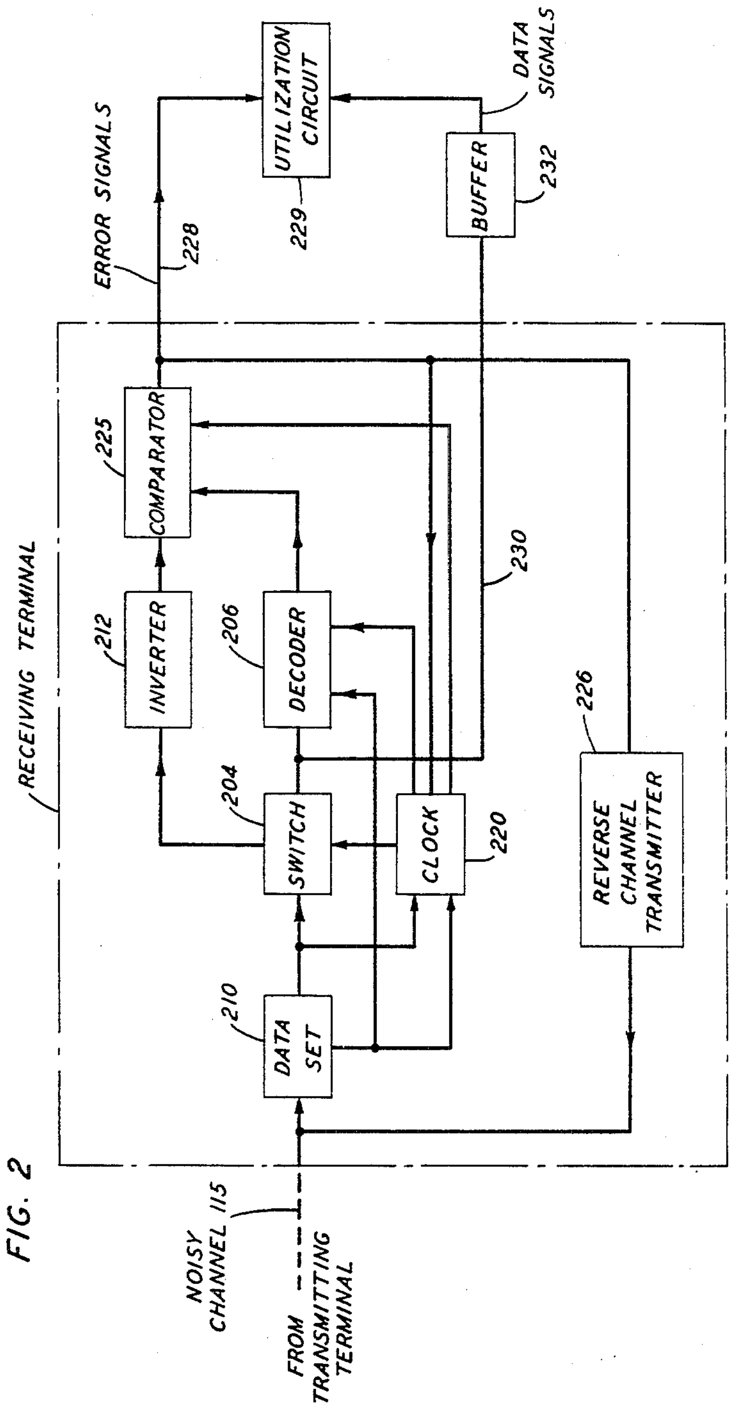

A complete understanding of the present invention and of the above and other objects, features and advantages thereof may be gained from a consideration of the following detailed description of a specific illustrative embodiment presented hereinbelow in connection with the accompanying drawing, in which:

FIGS. 1 and 2 show, respectively, transmitting and receiving terminals which together comprise a specific illustrative error-detecting system made in accordance with the principles of the present invention; and FIGS. 3 and 4 are matrix representations which are helpful in describing the over-all mode of operation of the system shown in FIGS. 1 and 2.

The transmitting terminal illustrated in FIG. 1 includes a source 100 for supplying binary data signals, each $n$-digit sequence of which comprises a data word. The source 100 is assumed to be capable of generating $2^n$ different $n$-digit binary sequences. Herein, for illustrative purposes, $n$ will be assumed to be 21. Hence, the source 100 will be considered to be capable of generating $2^{21}$ or approximately 2,000,000 different 21-digit binary sequences.

Each $n$-digit data sequence supplied by the source 100 is applied via a buffer 102 and a first controlled switch 104 to an encoder 106. Also, each data sequence is applied from the output of the switch 104 to a data set 110 via a second controlled switch 108. It is noted that the switch 108 is simply a routing mechanism which, under the control of signals from a clock 120, either completes a path from the output of the switch 104 to the input of the set 110 or, alternatively, completes a path from the output of an inverter unit 112 to the input of the set 110.

In the encoder 106 a $k$-digit parity check sequence is derived from the $n$ data digits applied thereto. These check digits are then inverted by the inverter unit 112 and applied via the switch 108 to the data set 110 to be appended to the associated $n$-digit data sequence from which the $k$ check digits were generated. Thus, the redundant sequence to be transmitted to the specific illustrative receiving terminal shown in FIG. 2 comprises $n+k$ digits, the first $n$ of which are information or data signals and the last $k$ of which are parity check signals added for error-detecting purposes.

The data set 110 shown in FIG. 1 modulates the data and check signals applied thereto and then applies them to a noisy channel 115 which is prone to introducing errors into the signal sequences propagated therealong. Additionally, the set 110 supplies regularly-occurring timing signals to the clock unit 120 which controls the operation of the buffer 102, the switches 104 and 108 and the encoder 106. The basic timing signals supplied by the set 110 are also applied directly to the buffer 102, the encoder 106 and a frequency divider 122. In turn, the output of the divider 122 is applied via a third controlled switch 124 to the data signal source 100.

The switch 124 is controlled by signals applied thereto from a reverse channel receiver 126 which comprises a conventional frequency-selective receiver and associated control logic. The receiver 126 is coupled to a reverse channel transmitter 226 (FIG. 2) by the same channel 115 over which encoded data signals are transmitted to a remote location. Advantageously, the reverse channel equipment operates over a narrow frequency range centered at a frequency well below those used for forward transmission of data and check signals. Consequently the data set and reverse channel frequencies can be transmitted simultaneously over the channel 115 without interference therebetween.

Whenever the switch 124 is enabled or closed in response to gating signals from the reverse channel receiver 126, the source 100 is activated by signals received from the divider 122 and, as a result, data signals are then applied from the source 100 to the buffer 102. If, on the other hand, the switch 124 is disabled or open-circuited in response to signals from the receiver 126, the source 100 is deactivated and does not then supply any data signals to the buffer 102. As described in detail below, the reverse channel equipment is utilized initially to signal the transmitting terminal that the transmitting and receiving terminals are in synchronism. After synchronization has been achieved, the receiver 126 relinquishes control over the condition of the switch 124. Thereafter the reverse channel equipment is the means by which the transmitting terminal is signaled that a received sequence contains errors. Such error signal indications are applied via the reverse channel receiver 126 to an alarm unit 128 in the transmitting terminal and, in addition, are applied to an output line 228 in the receiving terminal.

Advantageously, the data set 110 shown in FIG. 1 may be of the type described in "Phase-Modulation Data Sets for Serial Transmission at 2,000 and 2,400 Bits per Second," by P. A. Baker, A.I.E.E. Transactions, Part 1, No. 61, pages 166–171, July 1962. The particular data set described therein includes a crystal oscillator from which are derived the basic timing signals mentioned above. Additionally, the encoder 106 of FIG. 1 may illustratively comprise equipment for implementing the aforementioned Bose-Chaudhuri codes. Such encoding equipment is well known in the art, being described, for example, on pages 107–135 of the Peterson text noted above.

It is also well known that each data sequence which is encoded in accordance with the noted Bose-Chaudhuri codes forms a redundant sequence which is an element of a systematic cyclic code. In other words, cyclic transformation or permutation of each such element forms another element of the code. Cyclic transformation refers to the technique by which, for example, the right-most one of a sequence of digits is removed and affixed to the left-hand side of the remaining digits, thereby to represent another sequence or element of the code. Successive transformations of this same type form other elements of the code. More specific information of the nature of systematic cyclic codes is contained in P. G. Neumann Patent 3,051,784, issued Aug. 28, 1962.

The operation of the transmitting terminal shown in FIG. 1 is as follows: initially, i.e., before synchronization is achieved between the transmitting terminal and the receiving terminal shown in FIG. 2, the switch 124 is disabled by the absence of suitable gating signals from the reverse channel receiver 126. As a result, no data signals are applied initially from the source 100 to the buffer 102. During this initialization the buffer 102, under control of signals applied thereto from the clock 120, couples $n$ "0" signals via enabled switch 104 to the encoder 106 and via the switch 108 to the data set 110. These $n$ "0" signals are modulated by the set 110 and applied to the channel 115. Subsequently, the switch 104 is disabled by the clock 120 and $k$ party check digits generated by the encoder 106 are inverted by the unit 112 and passed through the routing switch 108 to the data set 110 to appear in the $k$ digit positions immediately following those in which the $n$ "0" signals occurred.

Under normal operating conditions, and as described in detail below, the receiving terminal shown in FIG. 2 eventually signals the reverse channel receiver 126 (FIG. 1) that the transmitting and receiving terminals are in synchronism. In response thereto the receiver 126 enables the switch 124, which thereby allows driving signals from the divider 122 to be applied to the data signal source 100. In turn, the source 100 commences operation and applies an $n$-digit data sequence to the buffer 102 at a relatively low signal rate $R_1$ determined by the output frequency of the divider 122. (It is noted that $$R_1=\frac{n}{n+k}R_L$$

where $R_L$ is the transmission rate at which signals are transmitted over the channel 115). Subsequently, these data signals are shifted out of the buffer 102 and through the switch 104 to the encoder 106 and via the switch 108 to the data set 110. Advantageously, this shifting operation occurs at a rate which is higher than $R_1$, as determined by the output frequency of the crystal oscillator contained in the data set 110. After the first $n$-digit sequences has been passed through the switch 104, the switch 104 is disabled and during a subsequent predetermined interval of time, parity check digits are appended to this first data sequence. During this subsequent interval data signals continue to be applied to the buffer 102 at the rate $R_1$. Thus the source 100 emits data signals in a constant uninterrupted fashion even though the switch 104 is temporarily disabled after the passage therethrough of each $n$-digit data sequence. During this temporary disablement an associated group of $k$ check digits is appended to the data sequence.

A more detailed insight into the over-all mode of operation of the specific illustrative transmitting terminal shown in FIG. 1 can be obtained from considering several specific encoding examples. Before doing this, however, let us consider the arrangement of the receiving terminal depicted in FIG. 2.

The illustrative terminal shown in FIG. 2 includes a data set 210 which also may be of the type described in the aforecited Baker article. Data signals received from the channel 115 by the set 210 are demodulated and then applied via a controlled switch 204 to a decoder 206. Under the control of signals applied from a clock 220 the switch 204 maintains a closed or complete path between the set 210 and the decoder 206 only long enough for the $n$ data signals of a received redundant sequence to be applied to the decoder 206. Subsequently, the switch 204 is controlled by clock signals to break the path between the set 210 and the decoder 206 and to establish a closed path between the set 210 and an inverter unit 212. The effect of this selective operation of the switch 204 is simply to route the data signals of a received sequence to the decoder 206 and to route the parity check digits thereof to the inverter 212.

In the decoder 206 another set of parity check signals is recalcuated from the received data signals in accordance with the same relationships originally imposed in the transmitting terminal by the encoder 106. Hence, if no errors occurred in the redundant sequence during transmission over the noisy channel 115, the recalculated check digits are identical to those generated in the transmitting terminal.

After being routed from the data set 210 to the inverter unit 212 by the switch 204, the received check digit signals are inverted and then applied to a comparator unit 225 wherein they are compared in a digit-by-digit manner with the recalculated check digits provided by the decoder 206. If the two sets of check digits are identical, no error signals are supplied by the comparator 225 via the output lead 228 to a utilization circuit or data sink 229 and, furthermore, the reverse channel transmitter 226 is not triggered to send an error-indicating signal to the transmitting terminal. If the two sets of check digits are not identical, the comparator 225 supplies an error signal to the lead 228 and triggers the transmitter 226 to send an error-indicating signal to the receiver 126 contained in the transmitting terminal shown in FIG. 1.

Data signals may be abstracted from the receiving terminal depicted in FIG. 2 via an output lead 230 connected to the input of the decoder 206. Advantageously, the lead 230 is connected to a buffer unit 232 from which data signals may be derived in a continuous fashion at a constant rate which is less than that at which signals are applied from the set 210 to the decoder 206. In this way an uninterrupted flow of data signals from the receiving terminal to the utilization circuit 229 can be provided.

In accordance with the particular Bose-Chaudhuri encoding techniques embodied in the novel system described herein, the all-zero data word mentioned above as being initially applied to the encoder 106 shown in FIG. 1 results in $k$ "0" signals being applied to the inverter 112. The units 112 converts these signals to $k$ "1" representations. As a result, the initial redundant sequence coupled to the channel 115 includes $n$ "0" signals followed by $k$ "1" signals. The clock 220 in the receiving terminal (FIG. 2) responds to such an initial sequence in a conventional manner by starting its cycle of operation in approximate time coincidence with the transition of the received sequence from its "0" indications to its first "1" indication. Once starter, the clock 220 continues operating in its normal predetermined mode only if the output of the comparator 225 indicates that the starting sequence received by the set 210 has been error-free. In response to an error-free initial sequence, the reverse channel transmitter 226 is triggered to send an "in-synchronism" signal to the reverse channel receiver 126 in the transmitting terminal. In turn, the receiver 126 responds to such a signal by enabling the switch 124 and thereby allowing driving signals from the divider 122 to be applied to the data source 100.

If the initial sequence transmitted to the receiving terminal of FIG. 2 is determined to contain errors, the clock 220 is deactivated by signals from the output of the comparator unit 225. Each subsequent encoded all-zero data sequence causes the clock 220 to restart and to be maintained active only if the encoded sequence is found to be error-free. Under normal operating conditions synchronism is eventually achieved and the transmitting and receiving terminals are then ready to send encoded information signals therebetween.

To understand better the over-all functioning of the illustrative system shown in FIGS. 1 and 2, let us consider some specific examples. Assume that the data source 100 emits the following randomly-selected 21-digit information word D:

100001000000010000000

(The digits of this word are delivered from the source 100 from right to left, i.e., the first digit emitted therefrom is the right-hand "0" digit.) The encoding of such a word in accordance with a Bose-Chaudhuri (31, 21) code may be represented by means of a so-called generator matrix G which is shown in FIG. 3. (See page 30 of the aforecited Peterson text for a discussion of generator matrices.) The redundant sequence which results from such an encoding operation is obtained simply by multiplying D (considered as a single row matrix) by the generator matrix G. The result of this conventional matrix multiplication is a 31-digit word, the first 21 digits of which are information digits and the last 10 digits of which are parity check digits. (See A Survey of Modern Algebra, by G. Birkhoff and S. MacLane, MacMillan Co., Chapter 8, for a discussion of matrices including matrix multiplication and matrix transposes.) Such a redundant sequence has embodied in it the capability to detect the occurrence therein of any combination of four or fewer digit errors. Furthermore, by means of this redundant sequence, it is possible to detect all error bursts therein of 10 digits or less, 511/512 of all error bursts 11 digits in length, and 1,023/1,024 of all error bursts 12 through 31 digits in length.

The encoded information word obtained from the aforementioned matrix multiplication of D and G is the following 31-digit redundant sequence V:

1010001101100001000000010000000

The 21 right-hand digits of V are the information digits originally supplied by the data source 100, and the left-hand 10 digits thereof are the parity check digits derived by the encoder 106 from the 21 information digits. Thus, if the generated check digits were not inverted, V is an actual representation of the sequence that could be coupled to the noisy channel 115.

In accordance with the principles of the present invention, the 10 generated check digits are in fact inverted before being appended to the 21 information digits. However, to understand the real significance of this feature of the present invention, let us assume initially for illustrative purposes that the check digits are not inverted. Then if the redundant sequence V is not mutilated during transmission over the noisy channel 115 and if, in addition, there is no loss of synchronism between the transmitting and receiving terminals shown in FIGS. 1 and 2, the comparator unit 225 would provide an all-zero output representation indicative of no errors having occurred in the received sequence. (In the herein-considered illustrative case in which the generated check digits are not inverted in the transmitting terminal, the receiving terminal would, of course, not include an inverter unit.)

The operation of the circuitry in the receiving terminal illustrated in FIG. 2 in checking for the occurrence of errors in each received sequence may be represented by means of a so-called null space matrix H which is shown in FIG. 4. (See pages 26–27, 31, 96 and 138 of the above-mentioned Peterson text for a discussion of null space matrices.) Matrix multiplication of a received sequence V by the transpose $H^T$ of the null space matrix H will give 10 "0's" as a product if V is an exact replica of the redundant sequence originally transmitted by the transmitting terminal of FIG. 1. More specifically, $$[V][H^T]=0000000000$$

if no mutilated digits and no synchronization shift occurred.

Assume now, for the case in which the generated check digits were not inverted, that the relative timing between the transmitting and receiving terminals falls out of synchronism by one digit position, such that the redundant sequence V is in effect shifted one digit to the right. The out-of-synchronism sequence V* may be represented as follows:

X 101000110110000100000001000000 where X signifies the first data digit of the next immediately-following redundant sequence being transmitted over the channel 115. As suggested above, the error detecting procedure may be represented by a matrix multiplication of V* by $H^T$ which, for the out-of synchronism case, gives

X 000000000 as the product. Clearly, if $X=0$, $V^*H^T=0$ and the receiving terminal would detect no error. In this case the received data word 110000100000001000000 would be accepted as a replica of the transmitted data word

100001000000010000000!

Thus, if "1's" and "0's" are transmitted with equal probability, only one-half of the blocks or sequences out of synchronism by one digit position would be detected as containing errors.

On the other hand, in accordance with the principles of the present invention, assume that the 10 check digits generated by the encoder 106 are inverted before being appended to the 21-digit data word specified above. In this case the redundant sequence $V_1$ coupled to the noisy channel 115 may be represented as follows:

0101110010100001000000010000000

The only difference between $V_1$ and the above-considered sequence V is that the left-hand 10 digits of $V_1$ are the respective inverses of the corresponding digits of V.

Assume further that $V_1$ is neither multilated nor shifted in phase before being received by the terminal shown in FIG. 2. The left-hand 10 digits of $V_1$ are then reinverted by the unit 212 and $V_1$ may thereby be regarded as having been converted back into V. And $VH^T=0$ which, as noted above, is indicative of the received data word being an exact replica of the transmitted one. Thus, it is seen that the novel inversion technique described herein does not affect normal error-free operation of the system.

If, on the other hand, synchronism between the transmitting and receiving terminals shown in FIGS. 1 and 2 is lost by one digit position, $V_1$ becomes $V_1^*$, where $$V_1^*=X\ 010111001010000100000001000000$$

When $V_1^*$ is received the left-hand 10 digits are inverted, and $V_1^*$ is converted to $V_2^*$, where $$V_2^*=\bar{X}\ 101000110010000100000001000000$$

($\bar{X}$ represents the inverse of X.) Matrix multiplication $V_2^*$ by $H^T$ gives $\bar{X}$ 100001100 as a product, which is not equal to "0" regardless of the value of X.

Thus, in accordance with the principles of the present invention, the assumed out-of-synchronism occurrence is seen to have been detected in an unequivocal maner. As a result, the data word portion of $V_2^*$ is flagged by error signals on the lead 228, and by error signals transmitted via the reverse channel equipment as not being an exact replica of the data word originally supplied by the source 100.

The error detecting capabilities of the illustrative system considered herein also extend, of course, to the case in which synchronism between the transmitting and receiving terminals is not lost, but in which some of the transmitted digits of a redundant sequence are mutilated during transmission. Then matrix multiplications of the type described above, as implemented by the specific circuitry shown in FIG. 2, provide indications of error occurrences at the output of the comparator unit 225. Each such indication appears on the lead 228 emanating from the receiving terminal of FIG. 2 and, in addition, is transmitted in the reverse direction to the transmitting terminal of FIG. 1 to activate the alarm unit 128.

Thus, an information-processing system made in accordance with the principles of this invention is capable of detecting the occurrence therein of mutilated digits and also of detecting the occurrence of errors arising from loss of synchronism between the transmitting and receiving equipment thereof. This over-all error detecting capability is achieved in a remarkably simple manner and provides an efficient reliable safeguard against undetected error occurrences.

The implementation of the source 100, the buffers 102 and 232, the inverters 112 and 212, the reverse channel equipment and the alarm 128, as well as the various switches and clocks included in the illustrative system, are considered in view of the end requirements thereof set forth above to be clearly within the skill of the art and are, accordingly, not set forth in detail herein.

It is to be understood that the principles of the present invention are not limited to systems in which Bose-Chaudhuri codes are embodied. Instead, these principles are considered applicable to any error detecting system in which systematic cyclic codes are utilized.

Furthermore, it is to be understood that the above-described arrangements are only illustrative of the application of the principles of the present invention. Numerous other arrangements may be devised by those skilled in the art without departing from the spirit and scope of the invention. For example, although emphasis herein has been directed to applying the principles of this invention to the detection of errors which occur on a transmission channel that interconnects spaced transmitting and receiving terminals, it is to be understood that these principles are equally applicable to the detection of errors in information-processing equipment, such as a computer, which is positioned at a single location.

Furthermore, although attention herein has been directed to the case in which synchronous timing signals are supplied to the described error detection system from the data sets 110 and 210, it is to be understood that selected ones of the units shown in FIGS. 1 and 2 may be adapted to provide timing signals. Alternatively, timing signals may be derived from suitable external clock circuitry (not shown).

What is claimed is:

1. Apparatus for applying encoded information signal sequences to an error-prone communication medium, said apparatus comprising means responsive to an information signal sequence for generating a check signal sequence in accordance with a systematic cyclic error-detecting code, and means responsive to each check sequence provided by said generating means for respectively inverting the signal representations thereof.

2. In combination, a source of digital data signals, encoding means responsive to data signals supplied by said source for deriving parity check digit signals therefrom, and means connected to said encoding means for inverting said check signals.

3. A combination as in claim 2 further including means connected to said source and to said inverting means for appending said check signals to said data signals to form a redundant signal sequence having specified error-detecting capabilities.

4. A combination as in claim 3 wherein said appending means includes a modulator coupled to one end of a noisy channel.

5. A combination as in claim 4 still further including a reverse channel receiver coupled to said one end of the channel for controlling the emission of data signals from said source.

6. A combination as in claim 5 still further including a receiving terminal connected to the other end of said channel for determining the error condition of redundant sequences propagated therealong.

7. In combination in an error control system, a source of digital data words which are to be transmitted via a noisy channel to a receiving terminal, encoding means responsive to each word supplied by said source for adding check digit signals thereto to form redundant sequences which are elements of a systematic cyclic code, and means connected between said encoding means and said channel for inverting the check digit signals included in each redundant sequence before the sequence is applied to said channel.

8. A combination as in claim 7 wherein said receiving terminal includes means responsive to the data word portion of a received redundant sequence for recalculating a set of check digit signals therefor in accordance with the same code relationships imposed by said encoding means, means responsive to the check digit portion of said received redundant sequence for respectively reinverting the check digit signals thereof, and means for comparing said recalculated check signals with said reinverted check signals and thereby providing an indication of whether or not the received data word is an exact replica of the data word supplied by said data source.

9. In combination in a redundant error-detecting system, a transmitting terminal comprising a source of digital data words which are to be transmitted via a noisy channel to a receiving terminal, an encoder responsive to each data word supplied by said source for deriving therefrom check digit signals to be added to said word to form redundant sequences which are elements of a systematic cyclic code, a buffer including an input terminal connected to said source and an output terminal connected to said encoder, a modulator coupled to one end of said channel, means connected to the output terminal of said buffer for applying to said modulator each data word supplied by said source, an inverter responsive to the output of said encoder for applying inverted check digit signals to said modulator in digit positions immediately following those assigned to the signals representative of said data word, a reverse channel receiver coupled to said one end of said channel for controlling the condition of said source, a device connected to said reverse channel receiver for receiving error-indicating signals therefrom and for providing an alarm indication thereof, and means controlled by said modulator and connected to said source, to said encoder, to said buffer and to said applying means for timing the relative operations thereof; a receiving terminal coupled to the other end of said channel, said receiving terminal comprising a demodulator coupled to said other end of said channel, a decoder connected via a junction point to said demodulator and responsive to the data word portion of each redundant sequence demodulated thereby for recalculating check digit signals in accordance with the same code relationships imposed by the encoder in said transmitting terminal, a unit connected to said demodulator and responsive to the check signal portion of each redundant sequence demodulated thereby for reinverting said check signals, a comparator connected to said inverter and to said decoder for comparing the respective check signal outputs thereof and for providing signal indications of whether or not the two sets of check signals are identical, a reverse channel transmitter responsive to the output indications of said comparator and coupled to said other end of said channel for transmitting control signals to the reverse channel receiver included in said transmitting terminal, a buffer connected to said junction point for providing an uninterrupted flow of data signals to a utilization circuit, means responsive to the output indications of said comparator for applying error-indicating signals to said utilization circuit, and means controlled by said demodulator and connected to said decoder and to said comparator for timing the relative operations thereof.

References Cited

UNITED STATES PATENTS

| | | | |
|---|---|---|---|
| 3,051,784 | 8/1962 | Neumann | 340—146.1 |
| 3,234,518 | 2/1966 | Rakoczi et al. | 340—146.1 |
| 3,237,157 | 2/1966 | Higby | 340—146.1 |
| 3,273,119 | 9/1966 | Helm | 340—146.1 |
| 3,156,767 | 11/1964 | Van Duuren et al. | 340—146.1 X |
| 3,163,848 | 12/1964 | Abramson | 340—146.1 |
| 3,230,309 | 1/1966 | Van Duuren et al. | 340—146.1 X |
| 3,398,400 | 8/1968 | Rupp et al. | 340—146.1 |

MALCOLM A. MORRISON, Primary Examiner

CHARLES E. ATKINSON, Assistant Examiner

U.S. Cl. X.R.

325—41